US009010837B2

(12) United States Patent
Mulholland et al.

(10) Patent No.: US 9,010,837 B2
(45) Date of Patent: Apr. 21, 2015

(54) TRUCK BED COVER ASSEMBLY

(71) Applicant: Timothy J. Mulholland, Danville, CA (US)

(72) Inventors: Timothy J. Mulholland, Danville, CA (US); Matthew James Roloff Mulholland, Danville, CA (US)

(73) Assignee: Timothy J. Mulholland, Danville, CA (US)

( * ) Notice: Subject to any disclaimer, the term of this patent is extended or adjusted under 35 U.S.C. 154(b) by 0 days.

(21) Appl. No.: 13/843,569

(22) Filed: Mar. 15, 2013

(65) Prior Publication Data

US 2014/0265404 A1  Sep. 18, 2014

(51) Int. Cl.
| | |
|---|---|
| *B60P 7/02* | (2006.01) |
| *A61G 3/08* | (2006.01) |
| *F41H 5/22* | (2006.01) |
| *A61G 3/06* | (2006.01) |

(52) U.S. Cl.
CPC .............. *B60P 7/02* (2013.01); *A61G 3/0875* (2013.01); *F41H 5/226* (2013.01); *A61G 3/062* (2013.01)

(58) Field of Classification Search
CPC ............ A61G 3/875; A61G 3/62; B60P 7/02; F41H 5/226; E05F 2017/008
USPC ................ 296/100.06, 100.07, 100.18, 37.6, 296/29.09, 26.11, 26.12, 39.1, 39.2, 76; 224/401
See application file for complete search history.

(56) References Cited

U.S. PATENT DOCUMENTS

| | | | |
|---|---|---|---|
| 3,069,199 A | | 12/1962 | Reardon et al. |
| 3,768,858 A | | 10/1973 | Boismier |
| 3,858,744 A | | 1/1975 | Garvert |
| 3,861,737 A | * | 1/1975 | Kirkbride ................ 296/100.18 |
| 4,210,358 A | * | 7/1980 | Sweet et al. ................ 296/100.1 |
| 4,302,044 A | * | 11/1981 | Sims .......................... 296/186.4 |
| 4,522,440 A | | 6/1985 | Gostomski |
| 4,531,775 A | | 7/1985 | Beals |
| 4,627,658 A | * | 12/1986 | Vold et al. ................... 296/100.1 |
| 4,832,394 A | | 5/1989 | Macomber |
| 4,943,194 A | | 7/1990 | Aguilar |
| 5,009,457 A | | 4/1991 | Hall |
| 5,011,214 A | | 4/1991 | Friesen et al. |
| 5,013,078 A | | 5/1991 | Eckerd et al. |
| 5,110,021 A | | 5/1992 | Dawson, Jr. |
| 5,209,543 A | | 5/1993 | Harkins, Jr. |
| 5,344,159 A | | 9/1994 | Powell |
| 5,464,264 A | | 11/1995 | Wilson |
| 5,503,450 A | | 4/1996 | Miller |
| 5,542,734 A | * | 8/1996 | Burchett et al. ............ 296/100.1 |
| 5,632,522 A | | 5/1997 | Gaitan et al. |
| 5,988,728 A | | 11/1999 | Lund et al. |
| 6,095,587 A | * | 8/2000 | Shirlee et al. ............ 296/100.07 |
| 6,224,140 B1 | | 5/2001 | Hoplock |
| 6,254,169 B1 | | 7/2001 | Arthur |
| 6,309,005 B1 | | 10/2001 | Priest et al. |
| 6,332,637 B1 | | 12/2001 | Chambers |
| 6,340,195 B1 | | 1/2002 | Hall et al. |
| 6,402,224 B1 | * | 6/2002 | Monaco et al. ............ 296/100.1 |

(Continued)

Primary Examiner — Pinel Romain
(74) Attorney, Agent, or Firm — Buchanan Ingersoll & Rooney PC

(57) ABSTRACT

A truck bed cover assembly includes a driver side cover door and a passenger side cover door and opening mechanisms which are electrically powered to independently open and close each of the cover doors from a closed position at which the cover doors enclose an upper end of the truck bed to an open position which can be varied up to at least 180° from the closed position.

15 Claims, 4 Drawing Sheets

(56) References Cited

U.S. PATENT DOCUMENTS

| | | |
|---|---|---|
| 6,481,774 B1 | 11/2002 | Norman et al. |
| 6,520,558 B1 | 2/2003 | Katterloher et al. |
| 6,598,930 B1 * | 7/2003 | Tilton .................... 296/100.06 |
| 6,607,229 B1 | 8/2003 | McIntosh |
| 6,783,169 B1 | 8/2004 | Marx et al. |
| 6,799,784 B2 | 10/2004 | Rios |
| 6,929,303 B1 | 8/2005 | Sharples |
| 6,951,363 B2 | 10/2005 | Hoffman |
| 7,246,839 B1 | 7/2007 | Nyberg |
| 7,384,089 B1 * | 6/2008 | Ablang et al. ........... 296/100.08 |
| 7,419,207 B2 | 9/2008 | Klein |
| 7,527,318 B2 * | 5/2009 | Geise ..................... 296/100.06 |
| 7,730,581 B2 | 6/2010 | Mirick |
| 7,735,898 B1 | 6/2010 | Bridges |
| 7,748,767 B2 | 7/2010 | Terhaar et al. |
| 7,806,457 B2 | 10/2010 | Bankert |
| 7,946,643 B2 | 5/2011 | Getschel et al. |
| 7,967,363 B2 * | 6/2011 | Schaefer et al. ......... 296/100.06 |
| 2004/0026948 A1 | 2/2004 | Navojovsky |
| 2013/0022780 A1 * | 1/2013 | Kawazoe et al. ............. 428/116 |

* cited by examiner

TRUCK BED COVER ASSEMBLY

FIELD OF THE INVENTION

The present invention relates generally to a double door cover assembly for a truck bed, and more particularly, relating to a double door cover assembly having a pair of doors that are movable to various positions up to at least 210° from a closed position.

BACKGROUND OF THE INVENTION

Pick-up trucks typically have an open truck bed of various dimensions located aft of the cab of the truck and the open truck bed allows for hauling of different types of cargo and allows easy access to the truck bed. Various covers are available for truck beds such as fabric material and hard tops. Some hard tops are one-piece and pivot at the end of the cargo bed adjacent the driver cab while others are hinged along the sides of the truck bed.

SUMMARY OF THE INVENTION

Disclosed herein is a truck bed cover assembly that is power operated to open and close double doors from a closed position to an open position which can be varied up to at least 180° from the closed position.

In a first embodiment, the truck bed cover assembly includes electrically powered opening mechanisms which can independently open the double doors. For example, the driver side opening mechanism can open the driver side cover door to an open position up to at least 180° from the closed position, e.g., provide a vertical extension in the 90° position to extend the height of the driver sidewall of the truck bed or a horizontal workspace extending outwardly from the truck bed in the 180° position or beyond 180° to 210°. Likewise, the passenger side cover door can be opened in the same manner by operating a passenger side opening mechanism to open the passenger side cover door to an open position up to at least 180° from the closed position, e.g., provide a vertical extension in the 90° position to extend the height of the passenger sidewall of the truck bed or a horizontal workspace extending outwardly from the truck bed in the 180° position or beyond 180° to 210°.

In a second embodiment, the cover assembly is detachable and can be installed on various truck beds. For example, the double doors can be pivotally mounted on the sidewalls of the truck bed and the opening mechanisms can be mounted on a front wall adjacent the cab of the truck.

In a third embodiment, each opening mechanism includes a pivot connection attached to one of the doors and a telescopic arm attached between the pivot connection and the front wall. For example, the driver side opening mechanism can include a first pivot connection on an underside of the driver side cover door and a first telescopic arm extending between the first pivot connection and a second pivot connection mounted on the front wall of the truck bed. The first telescoping arm includes a linear actuator which can extend and retract the first telescoping arm via a first electrically powered motor. Power for the first motor can be provided by the electrical system of the truck or a rechargeable power source such as one or more 12 volt batteries can be provided in a storage box located on the front wall. The passenger side opening mechanism can include a third pivot connection attached to an underside of the passenger side cover door and a second telescopic arm extending between the third pivot connection and a fourth pivot connection mounted on the front wall of the truck bed. The second telescoping arm includes a linear actuator which can extend and retract the second telescoping arm via a second electrically powered motor. Power for the second motor can be provided by the electrical system of the truck or the rechargeable power source.

In a fourth embodiment, each opening mechanism includes an actuator telescoping arm which opens a cover door by extending the telescoping arm to a desired position up to at least 180° from the closed position. To close the cover door, the opening mechanism retracts the telescoping arm to close the cover door. To provide a seal between the opposed edges of the doors, the doors can include overlapping edges with a seal along the edge of one or both doors. To open the door with its edge beneath the edge of the other door, it is necessary to partially open the overlapping door edge far enough to allow freedom of movement of the other door.

In a fifth embodiment, the cover doors are pivotally mounted on tops of the sidewalls of the truck bed by hinge assemblies. In a preferred embodiment, heavy duty hinges are located along the outside edges of each door. For example, the hinges can be weld-on barrel hinges which are welded to the tops of the truck sidewalls and undersides of the doors. In an embodiment, three weld-on hinges are located on the edge of each cover door. Alternatively, each hinge assembly can include an upper plate with a hinge connection on an upper surface of the upper plate, a plurality of through holes extending between the upper surface and a lower surface of the upper plate, a lower plate having through holes aligned with the holes in the upper plate, fasteners extending through the holes in the upper plate and the lower plate and passing through factory rail anchor points in the truck bed, and a rubber bushing around each fastener and clamped between the lower plate and an underside of the truck bed top wall of the driver sidewall or passenger sidewall. The hinge assemblies can be a full length hinge assemblies which extend the entire length of the cover doors.

In a sixth embodiment, the opening mechanism includes microswitches which are remotely controlled to open and close each cover door.

In a seventh embodiment, the telescoping arms are mounted so as to be horizontal when the cover doors are closed and rotate to an angle less that 30° when the cover doors are opened to the 180° position or beyond 180° to 210°.

In an eighth embodiment, the cover doors can include various features to provide functionality such as mounting equipment on the inside or outside of the cover doors and/or storage space inside the cover doors. For example, the cover doors can include a pattern of pre-drilled and plugged holes which can be later opened to attach mounting brackets to support electrical equipment such as spotlights, infrared or LED light fixtures, cameras, flat panel TV screens, or the like, hardware such as tools, weapons, recreational gear including bicycles, motorcycles, ATVs, firefighting, search and rescue equipment, or the like, or even signage such as posters, panels, digital displays or the like. For military or police use, the cover doors can be covered with ballistic protection such as five ply level-four KEVLAR matting. The insides of the cover doors can be hollow to store equipment such as ladders, fishing poles, tent equipment, or the like.

In a ninth embodiment, the cover doors can be adapted for human transport by incorporating a transport basket for injured patients or military personnel.

BRIEF DESCRIPTION OF THE DRAWINGS

The accompanying drawings, which are included to provide further understanding of the invention and are incorporated in and constitute a part of this specification, illustrate preferred embodiments of the invention and together with the description serve to explain the principles of the invention, in which.

DETAILED DESCRIPTION OF THE INVENTION

Reference will now be made in detail to the preferred embodiments of the present invention, examples of which are illustrated in the accompanying drawings.

Figure 1:
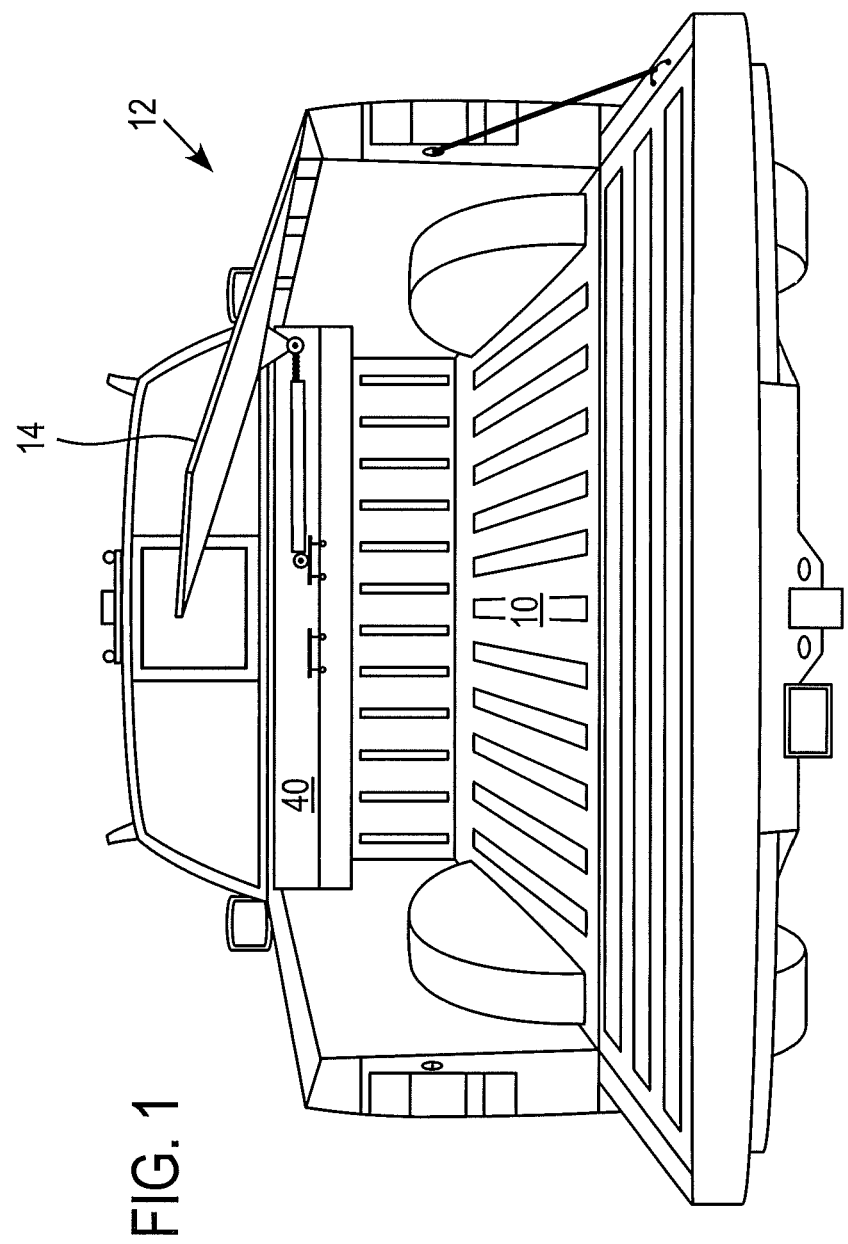
FIG. 1 is a perspective view of a conventional truck bed with a cover assembly in accordance with a preferred embodiment wherein only one cover door is shown in a partially open position.
Figure 2:
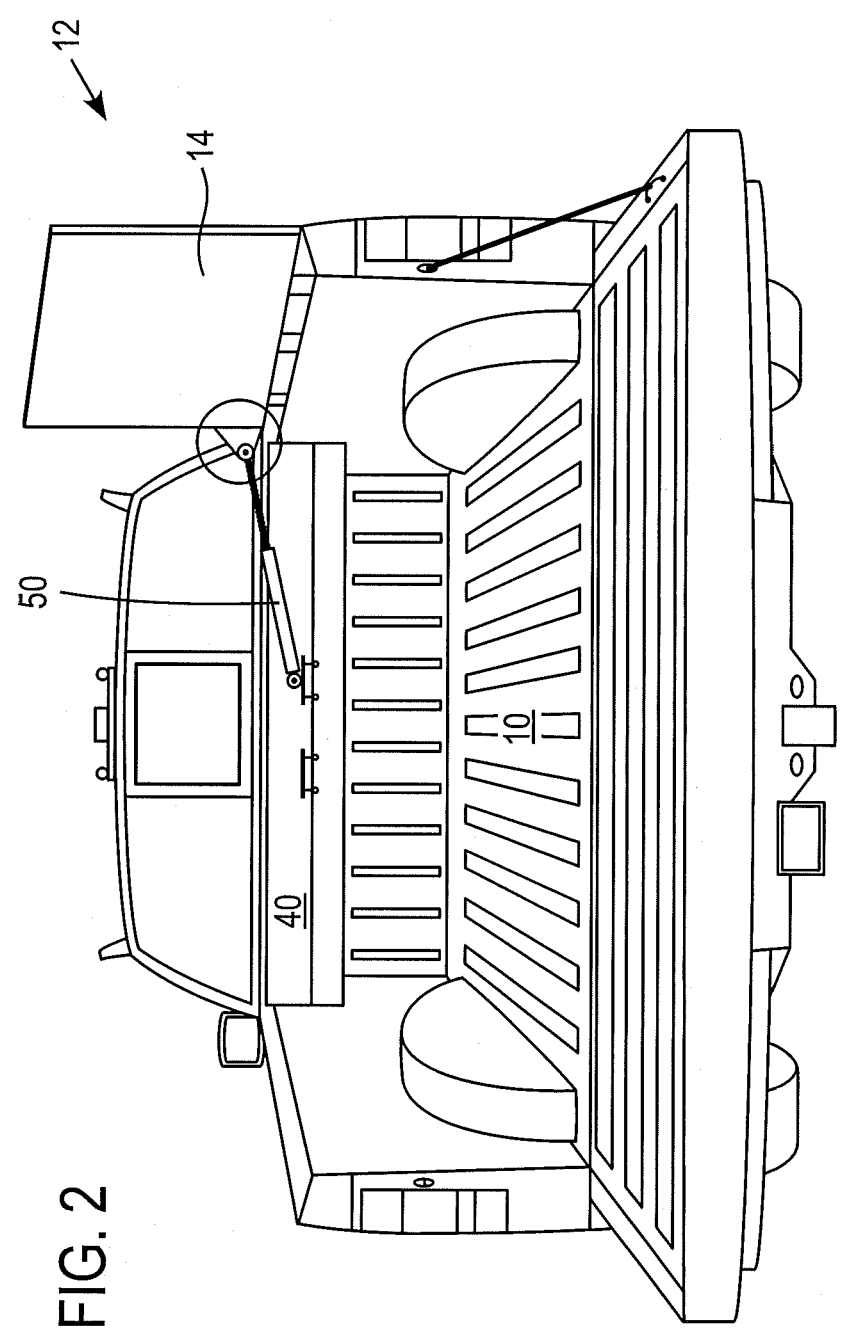
FIG. 2 is the same perspective view of FIG. 1 with the cover assembly in a half open position.
Figure 3:
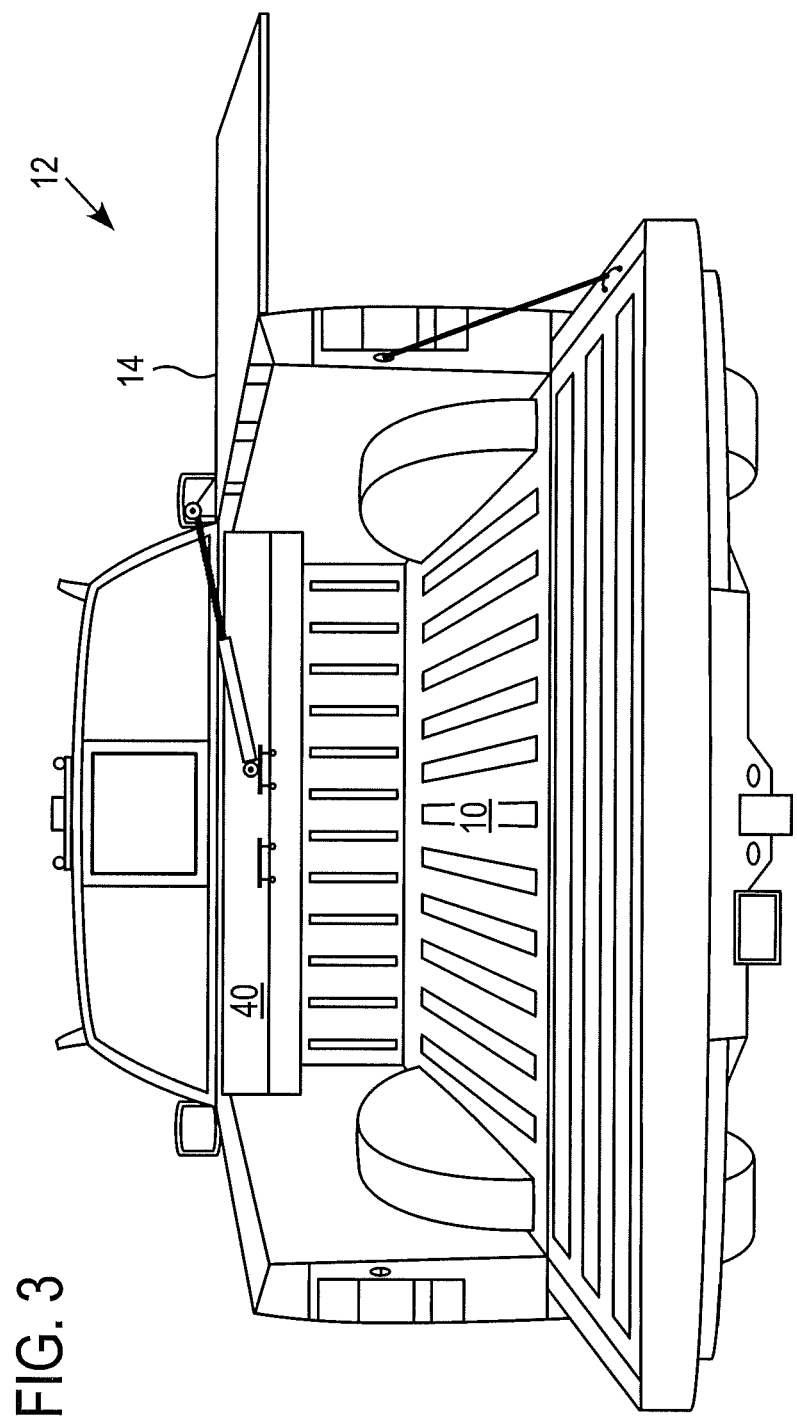
FIG. 3 is the same perspective view of FIG. 1 with the cover assembly in a fully open position.

FIG. 1 illustrates a conventional open topped pick-up truck bed 10 with a cover door 14 of a passenger side cover door assembly 12 constructed in accordance with a preferred embodiment of the present invention shown in a partially open configuration. While only the passenger side cover door assembly is shown, the driver side cover door (not shown) is arranged as a mirror image of the passenger side cover door assembly. FIG. 2 shows the cover door 14 in a half open position at 90° to the closed position. FIG. 3 shows the cover door 14 in a fully open position at 180° to the closed position. However, the doors can be opened even further if desired to 210°.

Figure 4:
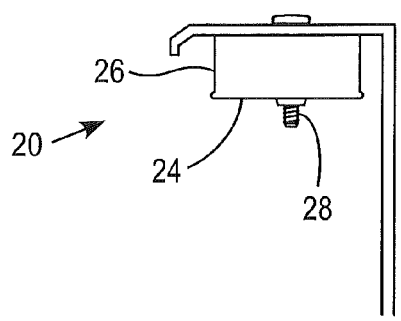
FIG. 4 is a cross sectional view of a mounting bracket which can be used to mount a hinge assembly to support a cover door.
Figure 5:
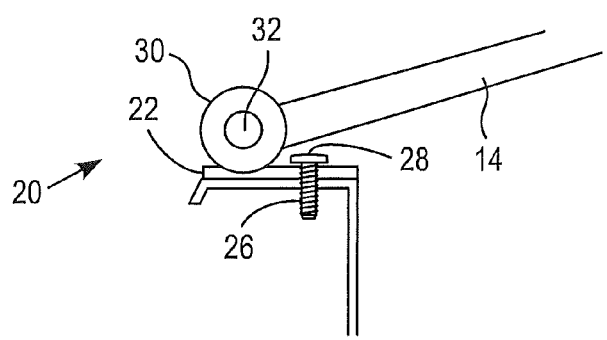
FIG. 5 is a cross sectional view of a hinge assembly attaching a cover door to the mounting bracket shown in FIG. 4.

In one embodiment, the cover door assembly is designed to fit various truck beds by using butterfly anchors which drop into the truck bed's factory rail anchor points. That is, conventional truck beds include predrilled holes which can be used to attach elastomeric cords or bolt attachments to the truck bed. As shown in FIGS. 4 and 5, a mounting bracket 20 includes an upper plate 22, lower plate 24, bushing 26 and fastener 28 such as a bolt. The upper plate 22 and the lower plate 24 have a series of holes matching the hole pattern of the rail anchor points of a particular truck model. The upper plate 22 and lower plate 24 preferably extend the entire length of the cover doors 14 to provide a continuous hinge along the top of each sidewall of the truck bed. The upper plates 22 include one-half of a hinge connection 30 similar to one plate of a common door hinge. The cover doors have matching hinge connections and can be attached to the upper plates with pins 32 extending the length of the cover doors. Rubber bushings 26 are mounted around each fastener 28 between the lower plates and the underside of the top wall extending along each sidewall of the truck bed.

Figure 6:
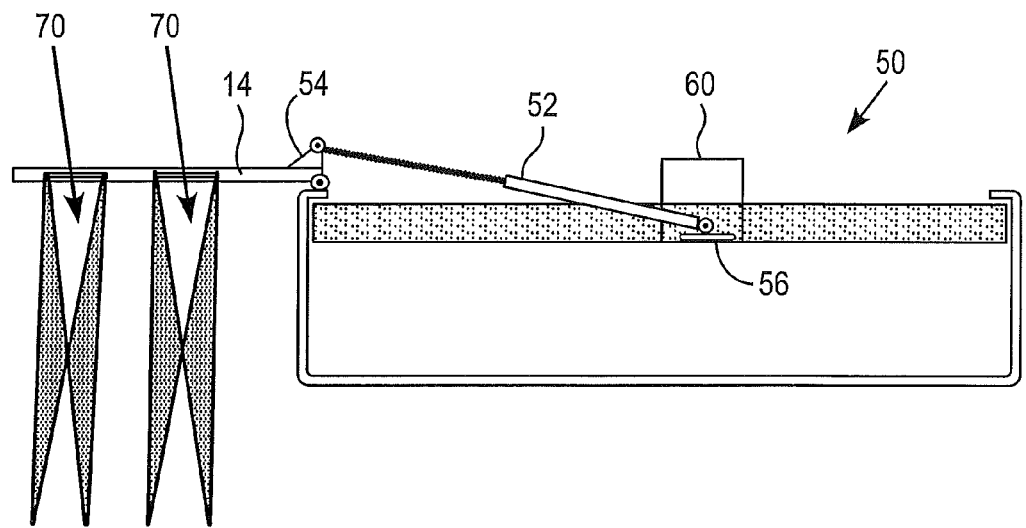
FIG. 6 shows details of the opening mechanism for the driver side cover door

As shown in FIGS. 1-3, a storage box 40 is located on the endwall of the truck bed adjacent the cab. The storage box contains the opening mechanism 50 for the cover doors and optionally a rechargeable power source such as one or more 12 volt batteries. As shown in FIG. 6, the opening mechanism includes a telescopic arm 52 and a pivot connection 54, pivot connection attached to the underside of each cover door 14 and the telescopic arm attached between the pivot connection 54 and the pivot connection 56 which mounts on the front wall of the truck bed adjacent the cab of the truck.

Disclosed herein is a truck bed cover assembly that is power operated to open and close double doors from a closed position to an open position which can be varied up to 180° or beyond 180° to 210° from the closed position. In the closed position the cover doors preferably form a waterproof seal along opposed surfaces.

In a first embodiment, the truck bed cover assembly includes electrically powered opening mechanisms which can independently open the double doors. For example, the driver side opening mechanism can open the driver side cover door to an open position up to at least 180° from the closed position, e.g., provide a vertical extension in the 90° position to extend the height of the driver sidewall of the truck bed or a horizontal workspace extending outwardly from the truck bed in the 180° position or beyond 180° to 210°. Likewise, the passenger side cover door can be opened in the same manner by operating a passenger side opening mechanism to open the passenger side cover door to an open position up to at least 180° from the closed position, e.g., provide a vertical extension in the 90° position to extend the height of the passenger sidewall of the truck bed or a horizontal workspace extending outwardly from the truck bed in the 180° position or beyond 180° to 210°.

In a second embodiment, the truck bed cover assembly is detachable and can be installed on various truck beds. For example, the double doors 14 can be pivotally mounted on the sidewalls of the truck bed and the opening mechanisms 50 can be mounted on a front wall adjacent the cab of the truck.

In a third embodiment, each opening mechanism includes a pivot connection 54 attached to one of the doors and a telescopic arm 52 attached between the pivot connection 54 and another pivot connection 56 mounted on the front wall. For example, the driver side opening mechanism can include a first pivot connection attached to an underside of the driver side cover door and a linear actuator which includes a first telescopic arm extending between the first pivot connection and a second pivot connection mounted on the front wall of the truck bed. The first telescoping arm includes a linear actuator which can extend and retract the first telescoping arm via a first electrically powered motor 60. Power for the first motor can be provided by the electrical system of the truck or a rechargeable power source such as one or more 12 volt batteries (not shown) can be provided in a storage box located on the front wall. The passenger side opening mechanism can include a third pivot connection attached to an underside of the passenger side cover door and a second linear actuator which includes a telescopic arm extending between the third pivot connection and a fourth pivot connection mounted on the front wall of the truck bed. The second telescoping arm includes a linear actuator which can extend and retract the second telescoping arm via a second electrically powered motor. Power for the second motor can be provided by the electrical system of the truck or the rechargeable power source. The motor preferably includes a clutch mechanism to maintain each linear actuator in a fixed position if power is not supplied to either of the motors. Thus, the cover doors can be held in any desired position simply by stopping the motors. The second and fourth pivot connections and the first and second linear actuators can be located in the storage box mounted on the front wall of the truck bed.

In a fourth embodiment, each opening mechanism includes an actuator telescoping arm which opens a cover door by extending the telescoping arm to open the cover door to a desired position up to at least 180° from the closed position. To close the cover door, the opening mechanism retracts the telescoping arm to close the cover door. To provide a seal between the opposed edges of the doors, the doors can include overlapping edges with a seal along the edge of one or both doors. To open the door with its edge beneath the edge of the other door, it is necessary to partially open the overlapping door edge far enough to allow freedom of movement of the other door.

In a fifth embodiment, the cover doors are pivotally mounted on tops of the sidewalls of the truck bed by hinge assemblies. In a preferred embodiment, heavy duty hinges are located along the outside edges of each door. For example, each door can include at least two or three hinges and the hinges can be barrel hinges which are bolted or welded to the tops of the truck sidewalls and undersides of the doors. Such barrel hinges include male and female components in which the male component includes a plate bolted or welded onto the top of the sidewall of the truck body (or underside of one of the cover doors) and the female component includes a plate bolted or welded onto the underside of a cover door (or top of the sidewall). The male component includes a longitudinally extending pin fitted in a recess of the female component and a grease fitting can be provided on an end of the female component to lubricate the clearance between the pin and recess. Suitable hinges include grade eight hardened steel hinges available from Conquest Armored Vehicles. Other heavy duty hinges include weld-on barrel hinges as disclosed in U.S. Pat. No. 7,730,581, the disclosure of which is hereby incorporated by reference. Alternatively, each hinge assembly can include an upper plate with a hinge connection on an upper surface of the upper plate, a plurality of through holes extending between the upper surface and a lower surface of the upper plate, a lower plate having through holes aligned with the holes in the upper plate, fasteners extending through the holes in the upper plate and the lower plate and passing through factory rail anchor points in the truck bed, and a rubber bushing around each fastener and clamped between the lower plate and an underside of the truck bed top wall of the driver sidewall or passenger sidewall. The hinge assemblies can be a full length hinge assemblies which extend the entire length of the cover doors.

In a sixth embodiment, the opening mechanism includes microswitches which are remotely controlled to open and close each cover door. The remote control can include a remote control transmitter and a receiver electrically connected to each motor such that each cover door can be independently opened or closed by a person operating the remote control transmitter.

In a seventh embodiment, the telescoping arms are mounted so as to be horizontal when the cover doors are closed and rotate to an angle less that 30° when the cover doors are opened to the fully opened 180° position.

In an eighth embodiment, the cover doors can include various features to provide functionality such as mounting equipment on the inside or outside of the cover doors and/or storage space inside the cover doors. For example, the cover doors can include a pattern of pre-drilled and plugged holes which can be later opened to attach mounting brackets to support electrical equipment such as spotlights, infrared or LED light fixtures, cameras, flat panel TV screens, or the like, hardware such as tools, weapons, recreational gear including bicycles, motorcycles, ATVs, firefighting, search and rescue equipment, or the like, or even signage such as posters, panels, digital displays or the like. For military or police use, the cover doors can be covered with ballistic protection such as five ply level-four KEVLAR matting. The insides of the cover doors can be hollow to store equipment such as ladders 70 (see FIG. 6), fishing poles, tent equipment, or the like.

In a ninth embodiment, the cover doors can be adapted for human transport by incorporating a transport basket for injured patients or military personnel.

It will be appreciated by those of ordinary skill in the art that the present invention can be embodied in other specific forms without departing from the spirit or essential characteristics thereof. The presently disclosed embodiments are therefore considered in all respects to be illustrative, and not restrictive. The scope of the invention is indicated by the appended claims, rather than the foregoing description, and all changes that come within the meaning and range of equivalence thereof are intended to be embraced therein.

What is claimed is:

1. A truck bed cover assembly comprising a driver side cover door and a passenger side cover door and opening mechanisms which are electrically powered to independently open and close each of the cover doors from a closed position at which the cover doors enclose an upper end of a truck bed of a truck to an open position which can be varied up to at least 180° from the closed position wherein each opening mechanism includes an actuator telescoping arm which opens a cover door by extending the telescoping arm to open the cover door to a desired position wherein each opening mechanism includes a telescopic arm mounted in a storage box which mounts along the front wall of the truck bed and the driver side opening mechanism includes a first telescopic arm including an internal screw mechanism which can extend and retract the first telescoping arm via a first electrically powered motor.

2. The truck bed cover assembly of claim 1, including driver side and passenger side electrically powered opening mechanisms which can independently open the cover doors, the driver side opening mechanism operable to open the driver side cover door to an open position up to at least 180° from the closed position thereby providing a vertical extension in the 90° position to extend a height of a driver sidewall of the truck bed or a horizontal workspace extending outwardly from the truck bed in the 180° position, and the passenger side opening mechanism operable to open the passenger side cover door to an open position up to at least 180° from the closed position thereby providing a vertical extension in the 90° position to extend a height of a passenger sidewall of the truck bed or a horizontal workspace extending outwardly from the truck bed in the 180° position.

3. The truck bed cover assembly of claim 1, wherein the cover assembly is detachable and can be installed on various truck beds wherein the driver side and passenger side cover doors can be pivotally mounted on sidewalls of the truck bed and the opening mechanisms can be mounted on a front wall adjacent the cab of the truck.

4. The truck bed cover assembly of claim 1, wherein each opening mechanism includes a first pivot connection attached to one of the doors and a telescopic arm attached between the first pivot connection and a second pivot connection mounted on a front wall of the truck bed.

5. The truck bed cover assembly of claim 4, wherein the telescoping arms are mounted so as to be horizontal when the cover doors are closed and rotate to an angle less that 30° when the cover doors are opened to the fully opened 180° position.

6. The truck bed cover assembly of claim 1, wherein the cover doors are pivotally mounted on tops of sidewalls of the truck bed by hinge assemblies, each hinge assembly including an upper plate with a hinge connection on an upper surface of the upper plate, a plurality of through holes extending between the upper surface and a lower surface of the upper plate, a lower plate having through holes aligned with the holes in the upper plate, fasteners extending through the holes in the upper plate and the lower plate and passing through factory rail anchor points in the truck bed, and a rubber bushing around each fastener and clamped between the lower plate and an underside of the truck bed top wall of the driver sidewall or passenger sidewall.

7. The truck bed cover assembly of claim 1, wherein the cover doors are pivotally mounted on tops of sidewalls of the truck bed by a plurality of weld-on barrel hinges.

8. The truck bed cover assembly of claim 1, wherein the opening mechanisms are remotely controlled to open and close each cover door.

9. The truck bed cover assembly of claim 1, wherein the cover doors include a pattern of pre-drilled and plugged holes.

10. The truck bed cover assembly of claim 1, wherein at least one of the cover doors includes mounting brackets.

11. A truck bed cover assembly comprising a driver side cover door and a passenger side cover door and opening mechanisms which are electrically powered to independently open and close each of the cover doors from a closed position at which the cover doors enclose an upper end of a truck bed of a truck to an open position which can be varied up to at least 180° from the closed position wherein each opening mechanism includes a first pivot connection attached to one of the doors and a telescopic arm attached between the first pivot connection and a second pivot connection mounted adjacent or on a front wall of the truck bed and the driver side opening mechanism includes a first pivot connection attached to an underside of the driver side cover door and a first telescopic arm extending between the first pivot connection and the second pivot connection, the first telescoping arm including an internal screw mechanism which can extend and retract the first telescoping arm via a first electrically powered motor.

12. The truck bed cover assembly of claim 11, further including a rechargeable power source which is electrically connected to the electrical system of the truck and the first motor.

13. The truck bed cover assembly of claim 12, wherein the passenger side opening mechanism includes a third pivot connection attached to an underside of the passenger side cover door and a second telescopic arm extending between the third pivot connection and a fourth pivot connection mounted adjacent or on the front wall of the truck bed, the second telescoping arm including an internal screw mechanism which can extend and retract the second telescoping arm via a second electrically powered motor electrically connected to the rechargeable power source.

14. A truck bed cover assembly comprising a driver side cover door and a passenger side cover door and opening mechanisms which are electrically powered to independently open and close each of the cover doors from a closed position at which the cover doors enclose an upper end of a truck bed of a truck to an open position which can be varied up to at least 180° from the closed position wherein each opening mechanism includes an actuator telescoping arm which opens a cover door by extending the telescoping arm to open the cover door to a desired position, wherein each opening mechanism includes an actuator telescoping arm which opens a cover door by extending the telescoping arm to open the cover door to a desired position up to and including 210° from the closed position.

15. The truck bed cover assembly of claim 14, wherein the opening mechanism closes the cover door by retracting the telescoping arm to close the cover door.

* * * * *